US012468832B2

(12) United States Patent
Gupta et al.

(10) Patent No.: US 12,468,832 B2
(45) Date of Patent: *Nov. 11, 2025

(54) DATA ACCESS CONTROL SYSTEM ACCESSIBLE FROM THIRD-PARTY WEB

(71) Applicant: EQUIFAX INC., Atlanta, GA (US)

(72) Inventors: Rajan Gupta, Milton, GA (US); Justin Whitehead, Atlanta, GA (US); Josh Hanson, Cumming, GA (US)

(73) Assignee: EQUIFAX INC., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/304,344

(22) Filed: Apr. 21, 2023

(65) Prior Publication Data

US 2023/0259648 A1 Aug. 17, 2023

Related U.S. Application Data

(63) Continuation of application No. 16/253,545, filed on Jan. 22, 2019, now Pat. No. 11,651,095.

(Continued)

(51) Int. Cl.
*G06F 21/62* (2013.01)
*H04L 9/40* (2022.01)
(Continued)

(52) U.S. Cl.
CPC .......... *G06F 21/6218* (2013.01); *H04L 12/66* (2013.01); *H04L 63/0281* (2013.01);
(Continued)

(58) Field of Classification Search
CPC . G06F 21/6218; H04L 12/66; H04L 63/0281; H04L 63/029; H04L 63/083; H04L 63/0853; H04L 63/102; H04L 67/20
(Continued)

(56) References Cited

U.S. PATENT DOCUMENTS 8,364,583 B1 1/2013 Mussman et al.
10,832,319 B1 * 11/2020 Lister ..................... G06Q 40/03
(Continued)

OTHER PUBLICATIONS

U.S. Appl. No. 16/253,545, Advisory Action mailed on Sep. 15, 2021, 6 pages.
(Continued)

*Primary Examiner* — Moeen Khan
(74) *Attorney, Agent, or Firm* — Kilpatrick Townsend & Stockton LLP

(57) ABSTRACT

In some aspects, a gateway server can unlock or unfreeze access to data about a user by third parties without requiring the user to navigate completely away from a third-party website through which the user is executing an electronic transaction. The gateway server can receive a request to unlock or unfreeze data through the third-party website hosted by a third-party web server. The gateway server can output a user interface that is displayable simultaneously with the third-party website. Through the user interface, the gateway server can receive sign-in data such as log-in credentials of the user and consent to share data about the user with the third-party web server. The gateway server can output a command to unlock or unfreeze data about the user and to share the data with the third-party web server. Based on the shared data, the transaction can be completed at the third-party web server.

17 Claims, 6 Drawing Sheets

Related U.S. Application Data

(60) Provisional application No. 62/620,635, filed on Jan. 23, 2018.

(51) Int. Cl.
*H04L 12/66* (2006.01)
*H04L 67/53* (2022.01)

(52) U.S. Cl.
CPC .......... *H04L 63/029* (2013.01); *H04L 63/083* (2013.01); *H04L 63/0853* (2013.01); *H04L 63/102* (2013.01); *H04L 67/53* (2022.05)

(58) Field of Classification Search
USPC .............................................................. 726/6
See application file for complete search history.

(56) References Cited

U.S. PATENT DOCUMENTS

| | | | | |
|---|---|---|---|---|
| 11,410,230 | B1* | 8/2022 | Olson | G06F 21/6245 |
| 11,651,095 | B2 | 5/2023 | Gupta et al. | |
| 2003/0115126 | A1* | 6/2003 | Pitroda | G06Q 20/20 |
| | | | | 705/36 R |
| 2005/0055296 | A1 | 3/2005 | Hattersley et al. | |
| 2007/0145120 | A1 | 6/2007 | Webb | |
| 2013/0160144 | A1 | 6/2013 | Mok et al. | |
| 2014/0070001 | A1* | 3/2014 | Sanchez | G06Q 20/321 |
| | | | | 235/380 |
| 2014/0136704 | A1* | 5/2014 | Yang | H04L 67/53 |
| | | | | 709/225 |
| 2016/0155196 | A1* | 6/2016 | Haller | G06F 18/00 |
| | | | | 705/38 |
| 2016/0225074 | A1 | 8/2016 | Xiao et al. | |

OTHER PUBLICATIONS

U.S. Appl. No. 16/253,545, Advisory Action mailed on Sep. 2, 2022, 6 pages.
U.S. Appl. No. 16/253,545, Final Office Action mailed on Jul. 7, 2021, 18 pages.
U.S. Appl. No. 16/253,545, Final Office Action mailed on Jun. 2, 2022, 25 pages.
U.S. Appl. No. 16/253,545, Non-Final Office Action mailed on Feb. 23, 2021, 18 pages.
U.S. Appl. No. 16/253,545, Non-Final Office Action mailed on Jan. 18, 2022, 22 pages.
U.S. Appl. No. 16/253,545, Notice of Allowance mailed on Jan. 5, 2023, 16 pages.
Canadian Application No. 3,031,127, Office Action mailed on Oct. 31, 2023, 4 pages.
Canadian Application No. CA3,031,127, Office Action, Mailed on Jun. 20, 2024, 5 pages.

* cited by examiner

DATA ACCESS CONTROL SYSTEM ACCESSIBLE FROM THIRD-PARTY WEB

CROSS-REFERENCES TO RELATED APPLICATIONS

This application is a continuation of and claims priority to U.S. patent application Ser. No. 16/253,545, filed Jan. 22, 2019, which claims the benefit and priority under 35 U.S.C. § 119(e) of U.S. Provisional Application No. 62/620,635, filed on Jan. 23, 2018, each of which is incorporated by reference herein in their entirety.

TECHNICAL FIELD

This disclosure relates generally to online data access control. More specifically, but not by way of limitation, this disclosure relates to providing access and control for unlocking or unfreezing access to data by third parties.

BACKGROUND

Transactions can involve data or decisioning from sources, such as credit bureaus. Data from those sources can be locked or frozen such that the data is inaccessible to another party without the person or entity to which the data relates unlocking or unfreezing the data to allow access. This can require the person or entity to access the data source, provide instructions to unlock or unfreeze, and then return to the third party to complete the transaction.

SUMMARY

Various embodiments of the present disclosure provide unlocking or unfreezing access to data by third parties without requiring a user to navigate completely away from a third-party web server through which the user is executing a transaction. In one example, the functionalities provided herein are provided by a gateway server device. The gateway server device can receive, via a network communications port, an indication of a selection of an electronic icon on a third-party website hosted by the third-party web server. The gateway server device can output a website or another type of user interface that is displayable simultaneously with at least part of the third-party website.

Through the user interface, the gateway server device can receive sign-in data such as log-in credentials of a user or a personal identification number (PIN) of the user. The gateway server device can also receive, via the user interface, consent to share data about the user with the third-party web server. Based on the signing-in data and the consent, the gateway server device can output a command to unlock or unfreeze data about the user stored in a network-attached system and to share the data about the user with the third-party web server. The command can cause the data to be unlocked or unfrozen, and be shared with the third-party web server. Based on the data about the user, the transaction can be completed at the third-party web server.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

DETAILED DESCRIPTION OF THE INVENTION

Figure 1:
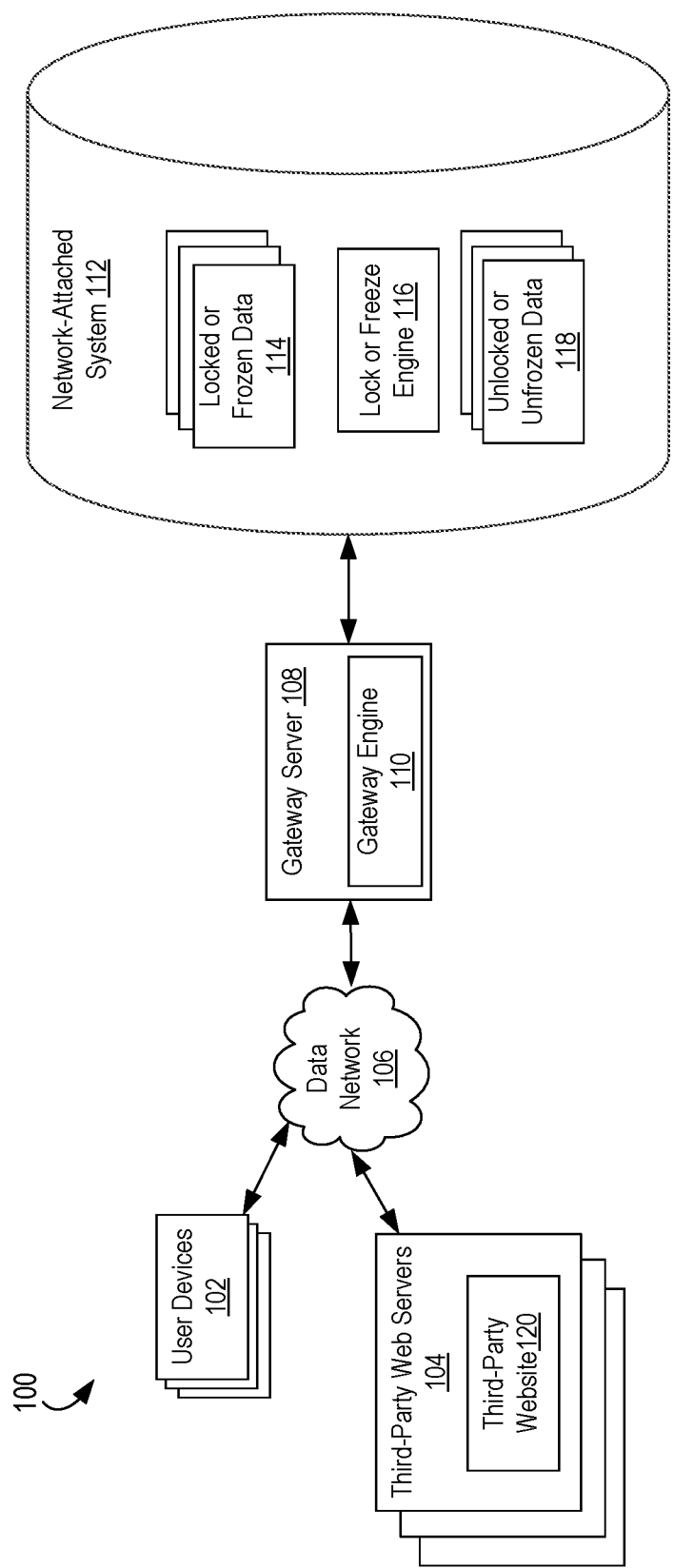
FIG. 1 is a block diagram depicting an example of a computing system that allows a user to request data about the user to be unlocked or unfrozen and consent for data to be provided to a third-party web server for conducting electronic transactions with the third-party web server according to certain aspects of the present disclosure.

Certain aspects and features of the present disclosure relate to providing access and control for unlocking or unfreezing access to data about a user by third parties without requiring the user to navigate completely away from a web server through which the user is executing a transaction. A gateway server can manage access between a third-party web server and one or more data sources by obtaining consent from a user and allowing the user to control access to data in the data sources. In one example, an online workflow can create a seamless transaction between a user, a third party, and a data source without the need for the user to switch between multiple external applications. The third party can be allowed to request access to any data source, such as credit bureau data asset (e.g., Equifax, TransUnion, or Experian credit file, Work Number file, NCTUE credit file, etc.). The user can authorize the access if the data is frozen or locked, giving temporary access to the requesting third party for the transaction.

The system can unlock a data source, provide the data to the third party, and then lock the data source from further access. A single call can be used to provide data to the third party, which the user can then validate. The data can include personally identifiable information, which can speed up an application process at the third party web server. A system according to some examples may only require a user's sign-in data, such as username and password, along with consent, to unlock data from a resource and provide the unlocked data or a decision on the application to the third party.

In some examples, a user interface control, such as a selectable icon can be included on a web page of a website provided by a third-party web server associated with a third party that is conducting a transaction with a user. A user can select the icon, which can result in a pop-up web page being provided to the user. The pop-up web page can include sign-in options by which the user can sign-in to an account of the data source and provide authorization for the third party to access data or receive a decision based on the data. Signing in can include receiving the user's log-in credentials or a freeze PIN, for example in the case of the data being frozen using a PIN.

The user can review and authorize the request to access the data, such as the credit bureau data asset, and other ancillary actions. The request can be determined by the originating application and can include lifting the data lock for one or more data sources for purposes of this transaction, unfreezing the data from access, authenticating the user to the third-party web server, pre-filling an online application hosted by the third-party web server, or providing a decision on the user's application to the third-party web server. The action can be determined based on instructions received from the third-party web server and the authorization received from the user. A gateway server can facilitate the request from the user to the one or more data sources by confirming sign-in information for the user's account and transmitting requests to appropriate designations.

As described herein, certain embodiments provide improvements to online computing environments by solving problems that are specific to online platforms. These improvements include providing an integrated and seamless online transaction workflow that speed up an online transaction process. The improvements also include a reduced usage of network bandwidth because there are fewer communications transmitted between the user device, the third party web servers and the data sources to provide the necessary information for the online transaction.

In addition, certain embodiments address the problem of retaining website users who, if adhering to the routine, conventional functioning of a website hosting the online transaction, would be sent away from the website after finding out that the data required for the transaction is locked or frozen. The embodiments presented herein allow a website user to click on a user interface control, such as an icon, on the third-party website while the user is in the process of the completing the online transaction, to unlock or unfreeze the data without leaving the third-party website. In this way, rather than losing visitors or users, the third-party website can send its visitors or users to a website or a web page that can be simultaneously presented with the third-party website and are provided by the gateway server for unlocking or unfreezing data without the users separately visiting the data sources' websites.

These illustrative examples are given to introduce the reader to the general subject matter discussed here and are not intended to limit the scope of the disclosed concepts. The following sections describe various additional features and examples with reference to the drawings in which like numerals indicate like elements, but should not be used to limit the present disclosure.

FIG. 1 depicts an example of a computing system 100 that is usable for allowing a user, via a user device 102, to request to unlock or unfreeze data and to consent for the unlocked or unfrozen data to be provided to a third-party web server 104 for conducting electronic transactions, such as credit card applications, with third-party web servers 104 that are operated by or otherwise associated with third parties. FIG. 1 depicts examples of hardware components of a computing system 100 according to some aspects. The computing system 100 is a specialized computing system that may be used for performing large amounts of authentication operations using a large number of computer processing cycles.

The devices depicted in FIG. 1 are provided for illustrative purposes. Different numbers of devices may be used. For example, while certain devices or systems (e.g., a gateway server 108, a network-attached system 112, etc.) are shown as single devices in FIG. 1, multiple devices may instead be used to implement these devices or systems (e.g., a cloud or grid-based telecommunications network server system, a group of network-attached storage devices, etc.).

The computing system 100 can include one or more user devices 102. The user devices 102 may include client devices that can communicate with the gateway server 108. The user device 102 may be a personal computer ("PC"), a desktop workstation, a laptop, a notebook, an electronic-book reader, a smartphone, a wearable computing device, a game console, a set-top box, a consumer electronics device, a server computer, or any other computing device capable of communicating with the gateway server 108 or other devices in the computing system 100. For example, the user devices 102 may send data to the gateway server 108 to be processed, may send signals to the gateway server 108 to control different aspects of the computing environment or the data that the gateway server 108 is processing. The user devices 102 may interact with the gateway server 108 via one or more data networks 106.

The computing system 100 can include one or more third-party web servers 104. Each third-party web server 104 may include one or more third-party electronic devices (e.g., computing devices or groups of computing devices), such as individual servers or groups of servers operating in a distributed manner. A third-party web server 104 can communicate with the gateway server 108. For example, third-party web servers 104 may send data to the gateway server 108 to be processed, may send signals to the gateway server 108 to control different aspects of the computing environment or the data that the gateway server 108 is processing. The third-party web servers 104 may interact with the gateway server 108 via one or more data networks 106. The third-party web servers 104 may also interact with the user devices 102 via one or more data networks 106 to facilitate electronic transactions between users of the user devices 102 and third-parties that use, operate, or are otherwise associated with the third-party web servers 104.

For instance, the electronic transactions might involve credit card applications and the third-party web servers 104 may be associated with a bank or a credit card company. To facilitate the credit card applications or other types of electronic transactions, the third-party web server 104 can present a third-party website 120 on the third-party web servers 104. By visiting and interacting with the third-party website 120 hosted by the third-party web servers 104 through a user device 102, a user may apply for a credit card with the bank or the credit card company by providing information for the application, submitting the application, obtaining an approval decision of the application, and so on. While the term "website" is used herein, the third-party website 120 can be a user interface other than a website or a webpage, such as a user interface of a client-side application executing on the user device 102, such as the user interface of an app executing on a laptop or a smartphone of the user and communicating with the third-party web servers 104.

Some electronic transactions can involve sensitive data about the user from data sources, such as credit bureaus. Due to their sensitivity, these data might be protected and locked or frozen from access by the third-party web servers 104. In order to facilitate the electronic transactions, the third-party web servers 104 can communicate with the gateway server 108 to integrate the process of unlocking or unfreezing the data about the user within the process of the electronic transactions. Through the integrated process, the user can communicate with the gateway server 108 to provide sign-in information for unlocking or unfreezing the data about the user, to provide authorization or consent to share the data about the user with the third-party web servers 104, to authorize other ancillary actions by the gateway server 108, and so on.

The gateway server 108 may be a specialized computer or other machine that processes the data received within the computing system 100. The gateway server 108 can include one or more processing devices that execute program code, such as a gateway engine 110. The program code is stored on a non-transitory computer-readable storage medium of the gateway server 108. The gateway engine 110 can execute a set of operations for managing communications from a user of a user device 102. The gateway engine 110 can also configure the gateway server 108 to communicate data with one or more third-party web servers 104 and a network-attached system 112 to control access to data in the network-attached system 112 with respect to the third-party web servers 104.

The gateway server 108 may include one or more other systems. For example, the gateway server 108 may include a database system for accessing the network-attached system 112, a communications grid, or both. A communications grid may be a grid-based computing system for processing large amounts of data.

The network-attached system 112 may store a variety of different types of data organized in a variety of different ways and from a variety of different data sources. For example, the network-attached system 112 may include storage other than primary storage located within the gateway server 108 that is directly accessible by processors located therein. In some aspects, the network-attached system 112 may include secondary, tertiary, or auxiliary storage, such as large hard drives, servers, virtual memory, among other types. Storage devices may include portable or non-portable storage devices, optical storage devices, and various other mediums capable of storing and containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as compact disk or digital versatile disk, flash memory, memory or memory devices.

The network-attached system 112 can include memory devices for storing locked or frozen data 114, a lock or freeze engine 116, and unlocked or unfrozen data 118. The locked or frozen data 114 can include data about a user that is prevented from being accessible by third parties. The lock or freeze engine 116 can respond to commands from the gateway server 108 to unlock or unfreeze the data 114 and transform the data 114 into unlocked or unfrozen data 118 that can be accessed by third parties. The lock or freeze engine 116 can also lock or freeze data 118 to transform data 118 into locked or frozen data 114.

In order for the user to unlock or unfreeze data in the process of an electronic transaction, the gateway server 108 can generate a separate user interface, such as a website or a webpage separate from the third-party website 120 that can be presented within the third-party website 120. For example, the separate user interface can be embedded into the third-party website 120 so that the user does not need to leave the third-party website 120 when communicating with the gateway server 108. In another example, the separate user interface can be presented as a pop-up user interface overlaying the third-party website 120 or a portion thereof. Other ways of presenting the separate user interface without the user leaving the third-party website 120 can be implemented. Additional examples of generating and presenting the separate user interface will be presented below with regard to FIGS. 3-6.

By interacting with the separate user interface, the user can sign-in to an account of a data source that can provide the data about the user needed for the electronic transaction. The signing in can involve the user providing log-in credentials or a PIN and to request the data to be unlocked or unfrozen. Through the separate user interface, the user can further review and authorize or consent to the access to the data, such as the credit bureau data asset, by the third-party web servers 104.

Based on the authorization, the unlocked or unfrozen data 118 can be transmitted to the third-party web servers 104 through the gateway server 108 or without going through the gateway server 108. For example, the data 118 can be transmitted to the third-party web servers 104 via the data network 106 without being transmitted to the gateway server 108.

In some examples, the lock or freeze engine 116 or other components in the computing system 100, such as the gateway engine 110, can include a decisioning module that can determine a decision for the third party based on the data of the user and provide the decision to the third-party web server 104, with or without data about the user. In other examples, the lock or freeze engine 116 or other components in the computing system 100, such as the gateway engine 110, can pre-fill the data for the electronic transaction, such as pre-filling the credit card application, using the data about the user. The pre-filled electronic transaction can be transmitted to the third-party web server 104, with or without the unlocked data about the user. In these examples, the separate user interface can also include a mechanism, such as a button, a check box, or other selectable user interface control, to allow the user to authorize these ancillary actions, such as pre-filling the credit card application or providing the decision for the third party.

In some implementations, the data about the user is unlocked or unfrozen permanently until the network-attached system 112 receives another request authorized by the user to lock or freeze the data. In this way, a subsequent electronic transaction can be executed by the user on the third-party website 120 without interacting with the separate user interface provided by the gateway server 108. In other implementations, the data about the user is unlocked or unfrozen temporarily and the data is locked or frozen again after the data is shared with or otherwise provided to the third party. As a result, the user would go through the above process again for a subsequent electronic transaction.

Each communication within the computing system 100 (e.g., between user devices 102 and the gateway server 108, between third-party web servers 104 and the gateway server 108, etc.) may occur over one or more data networks 106. A data network 106 may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or a combination of wireless interfaces. A wired network may include a wired interface. The wired or wireless networks may be implemented using routers, access points, bridges, gateways, or the like, to connect devices in the data network 106.

A data network 106 may include network computers, sensors, databases, or other devices that may transmit or otherwise provide data to telecommunications network servers. For example, a data network 106 may include local area network devices, such as routers, hubs, switches, or other computer networking devices. The data network 106 can be incorporated entirely within (or can include) an intranet, an extranet, or a combination thereof. In one example, communications between two or more systems or devices can be achieved by a secure communications protocol, such as secure sockets layer ("SSL") or transport layer security ("TLS"). In addition, data or transactional details may be encrypted.

The features discussed herein are not limited to any particular hardware architecture or configuration. A computing device can include any suitable arrangement of components that provide a result conditioned on one or more inputs. Suitable computing devices include multipurpose, microprocessor-based computing systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Figure 2:
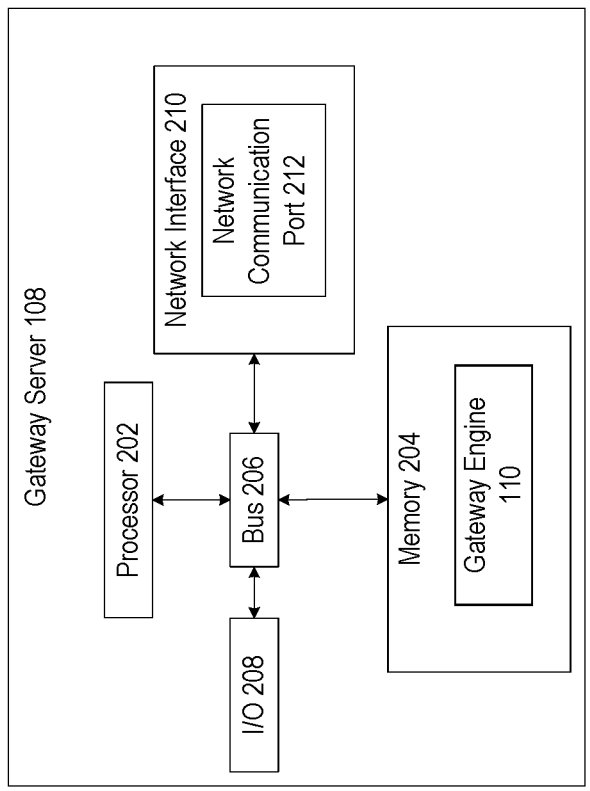
FIG. 2 is a block diagram depicting an example of a gateway server according to certain aspects of the present disclosure.

FIG. 2 is a block diagram depicting an example of a gateway server 108. The example of the gateway server 108 can include various devices for communicating with other devices in the computing system 100, as described with respect to FIG. 1. The gateway server 108 can include various devices for performing one or more authentication operations described above with respect to FIG. 1.

The gateway server 108 can include a processor 202 that is communicatively coupled to a memory 204. The processor 202 can execute computer-executable program code stored in the memory 204, access information stored in the memory 204, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others.

Examples of a processor 202 include a microprocessor, an application-specific integrated circuit, a field-programmable gate array, or any other suitable processing device. The processor 202 can include any number of processing devices, including one. The processor 202 can include or communicate with a memory 204. The memory 204 stores program code that, when executed by the processor 202, causes the processor to perform the operations described in this disclosure.

The memory 204 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, a CD-ROM, DVD, ROM, RAM, an ASIC, magnetic tape or other magnetic storage, or any other medium from which a computer processor can read and execute program code. The program code may include processor-specific program code generated by a compiler or an interpreter from code written in any suitable computer-programming language. Examples of suitable programming language include C, C++, C#, Visual Basic, Java, Python, Perl, JavaScript, ActionScript, etc.

The gateway server 108 may also include a number of external or internal devices such as input or output devices. For example, the gateway server 108 is shown with an input/output interface 208 that can receive input from input devices or provide output to output devices. A bus 206 can also be included in the gateway server 108. The bus 206 can communicatively couple one or more components of the gateway server 108.

The gateway server 108 can execute program code that includes the gateway engine 110. The program code for the gateway engine 110 may be resident in any suitable computer-readable medium and may be executed on any suitable processing device. For example, as depicted in FIG. 1, the program code for the gateway engine 110 can reside in the memory 204 at the gateway server 108. Executing the gateway engine 110 can configure the processor 202 to perform the operations described herein.

In some aspects, the gateway server 108 can include a network interface device 210. A network interface device 210 can include any device or group of devices suitable for establishing a wired or wireless data connection to one or more data networks 106. Non-limiting examples of the network interface device 210 include an Ethernet network adapter, a modem, etc. A network interface device 210 can include one or more network communications ports 212, where an address or other identifier of the communication port is used for communications with various other devices (e.g., a user device 102, a third-party web server 104, network-attached system 112, etc.).

Figure 3:
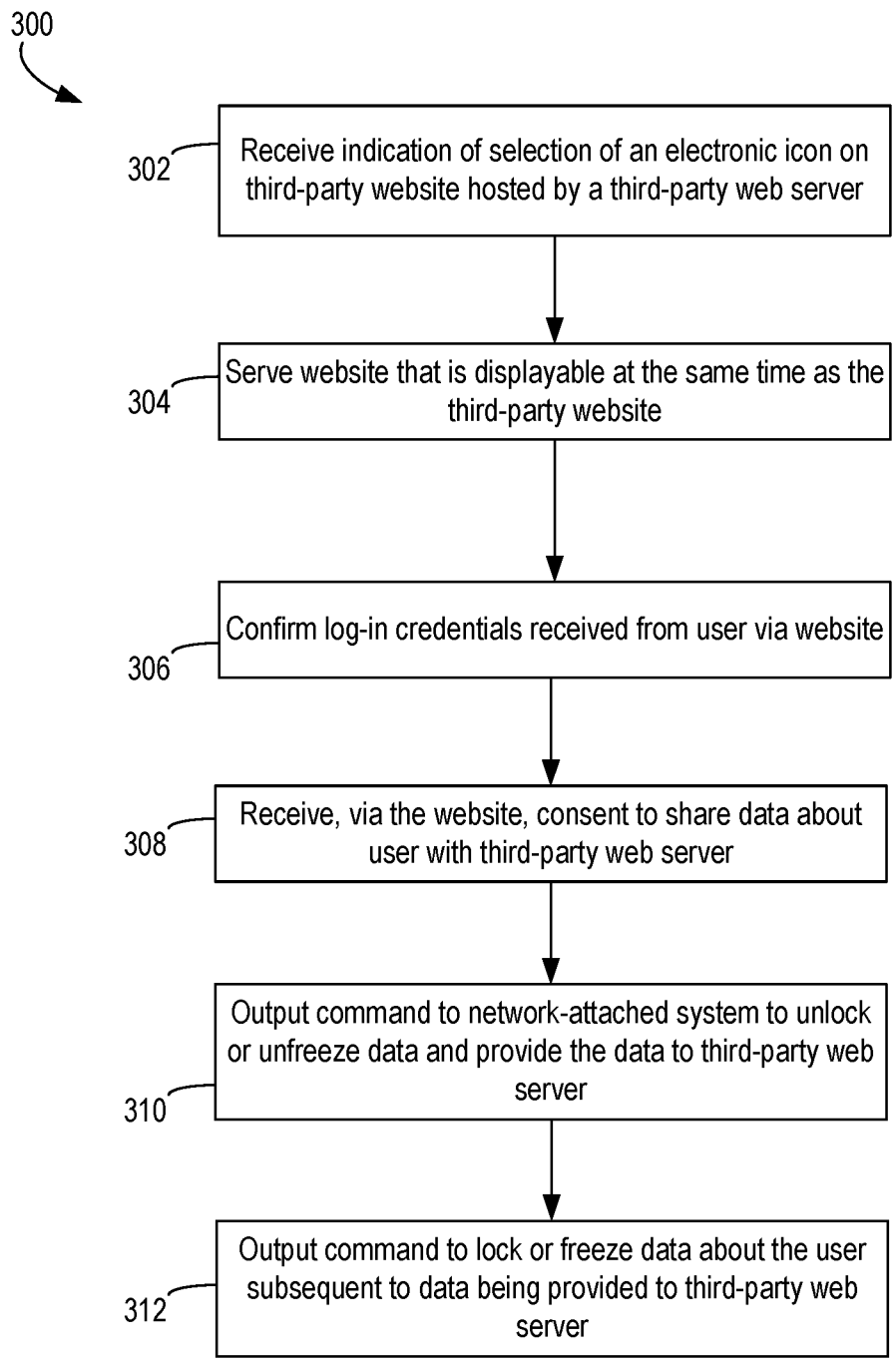
FIG. 3 is a flow chart depicting an example of a process for a gateway server managing access to locked or frozen data according to certain aspects of the present disclosure.

FIG. 3 is a flow chart of a process 300 for a gateway server managing access to locked or frozen data according to one example of the present disclosure. One or more computing devices (e.g., the gateway server 108 in the computing system 100) implement operations depicted in FIG. 3 by executing suitable program code (e.g., the gateway engine 110). For illustrative purposes, the process 300 is described with reference to certain examples depicted in the figures. Other implementations, however, are possible.

In block 302, the gateway server 108 receives a request to unlock or unfreeze data about the user. The request can include an indication of a selection of an electronic icon on a third-party website 120 hosted by a third-party web server 104. The electronic icon can be a user interface control, such as a selectable button, a checkbox, etc. The indication can be an electronic signal outputted by the third-party website 120 and received by the gateway server 108. The electronic signal can request the gateway server 108 to supply a separate user interface, such as a website for display to a user that has accessed the third-party website 120.

Figure 4:
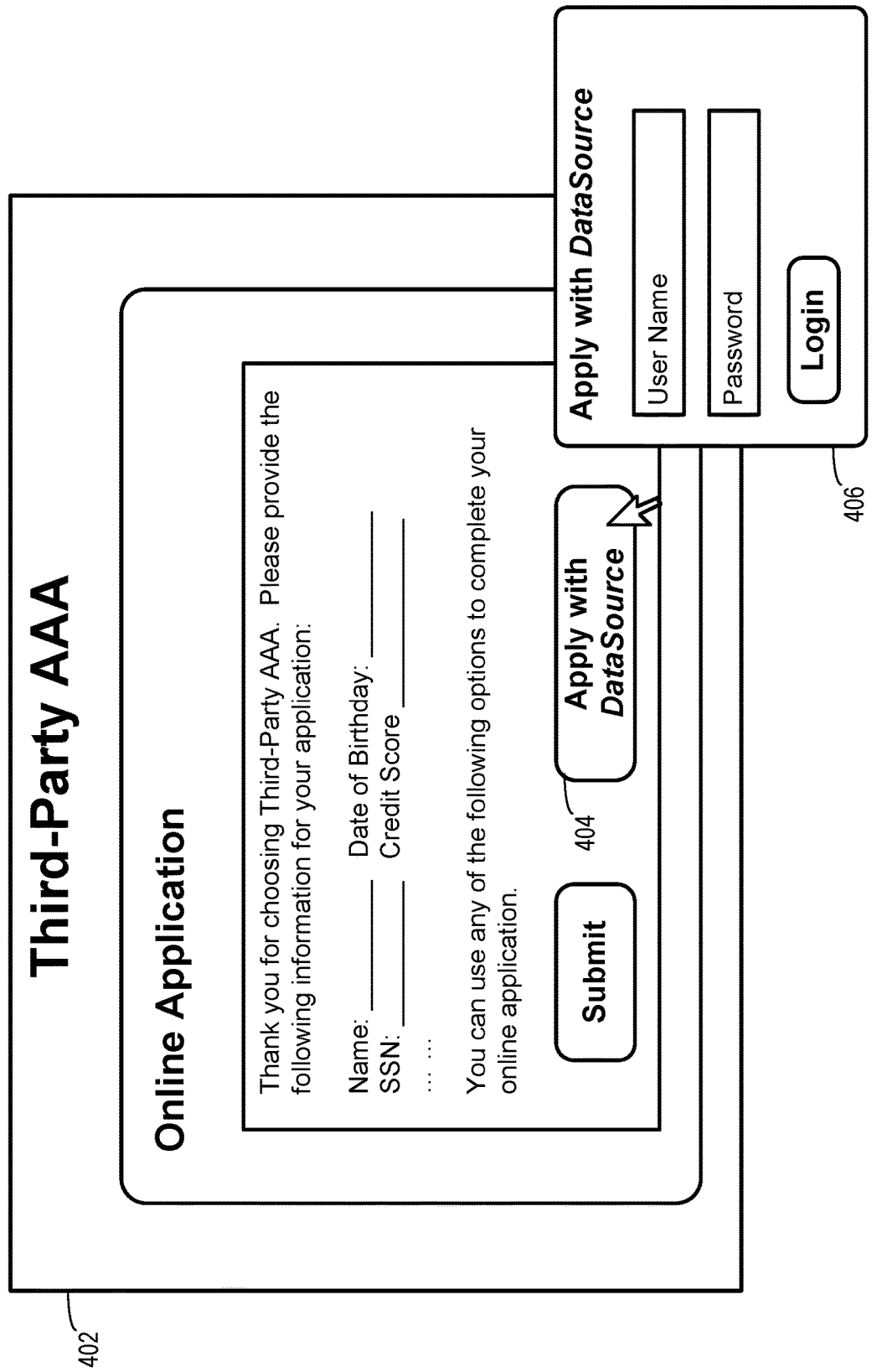
FIG. 4 depicts an example of a base website provided by a third-party web server associated with a third party that includes an application for a transaction according to certain aspects of the present disclosure.

In block 304, the gateway server 108 generates and serves a separate website that is displayable at the same time as the third-party website 120, also referred to herein as a "base website." For example, the separate website may be a so-called "pop-up" website that overlays part of a base website. In another example, the separate website may be embedded into the base website. FIG. 4 depicts an example of a base website 402 served by a web server 104 associated with a third party—i.e., "Third-Party AAA" that includes a user interface for submitting an online application for an electronic transaction. Included on the base website 402 is a selectable icon 404 "Apply with DataSource" that is selectable by a user and that, in response to being selected, outputs a request to the gateway server 108 to provide another website 406, shown as "Apply with DataSource" that can overlay part of the base website 402.

The separate website 406 shown in FIG. 4 allows a user to input log-in credentials (username and password in this example) that can be received by the gateway server 108. In other examples, a one-time PIN transmitted in an alternative channel or biometrics, such as fingerprint, retinal, and face scan, can be used. In some examples, the gateway server 108 can output a notification in a secondary channel to a user device 102 associated with the user to prevent fraudulent transactions. The notification can identify the third party associated with the third-party web server 104, along with the date, time, and other data. The notification can be provided to the user device 102 for the user to confirm that the transaction is non-fraudulent.

In block 306, the gateway server 108 confirms the log-in credentials received from the user via the separate website. The gateway server 108 may include credentials to which to compare the log-in credentials or the gateway server 108 can access another system, such as a network-attached system, an identity-provider system (e.g., in a SAML configuration), to confirm the credentials.

Figure 5:
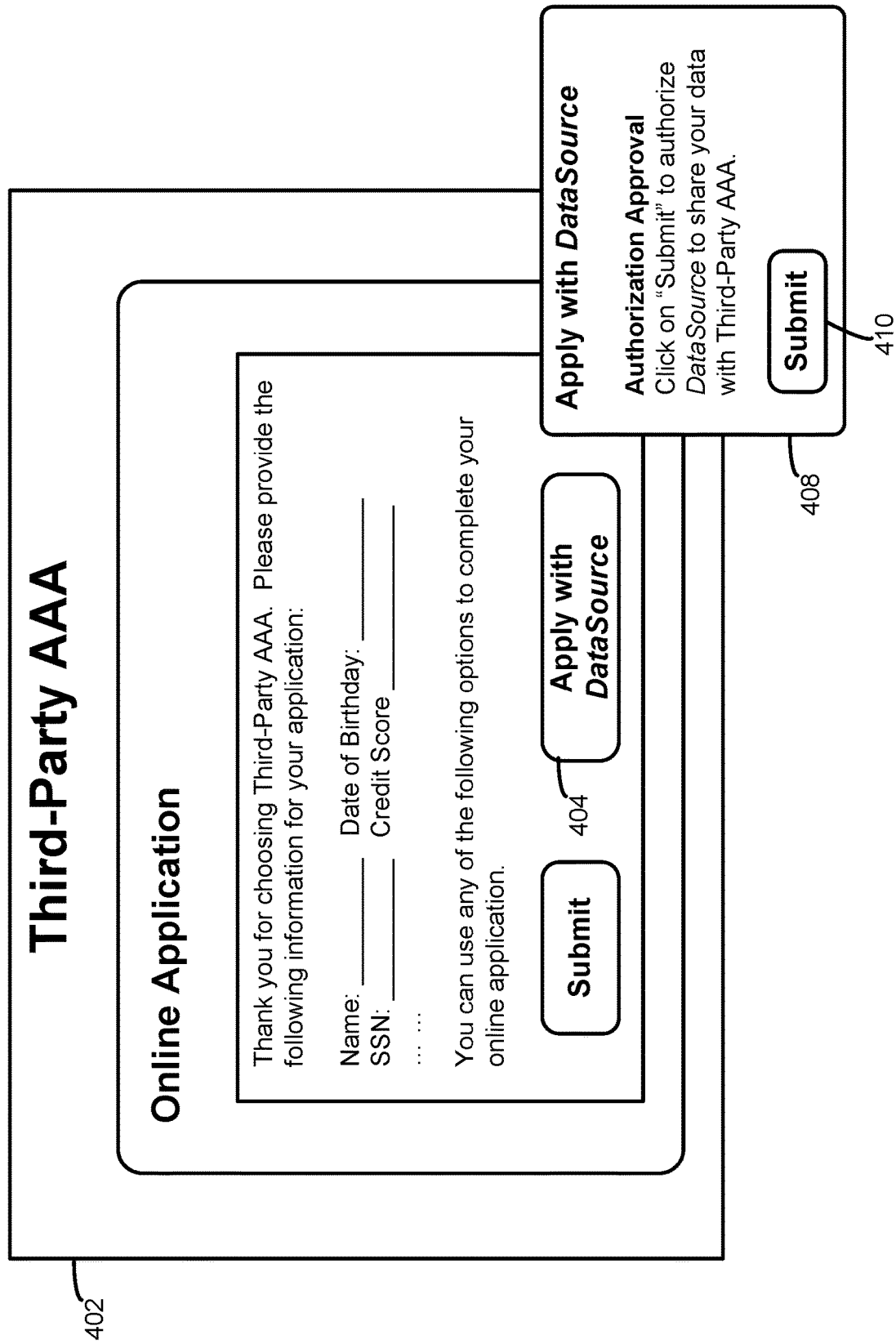
FIG. 5 depicts an example of a website that overlays a third party base website and can be used by a user to provide approval to share unlocked or unfrozen data about the user with the third-party web server according to certain aspects of the present disclosure.

In block 308, the gateway server 108 receives, via the separate website, consent to share data about the user with the third-party web server 104. FIG. 5 shows an example of the website 408 that overlays the third-party base website 402 and that includes an option 410 for a user to provide approval to share the data with the third-party web server 104. The website 408 can be generated and served by the gateway server 108 to the user after the gateway server 108 verifies the log-in credentials of the user. In addition, the gateway server 108 may also request and receive instructions from the user through the separate website regarding the unlocked and unfrozen data. For instance, the user can instruct the gateway server 108 through the separate website to unlock or unfreeze the data permanently. Alternatively, the user can instruct the gateway server 108 that the unlocking or unfreezing is temporary and the data should be locked and frozen subsequent to the data being provided to the third-party web server 104. In other examples, the gateway server 108 may also request and receive instructions from the user through the separate website regarding ancillary actions performed by the gateway server 108 using the data about the user. For example, the gateway server 108 can request consent or authorization from the user to pre-fill the information for the electronic transaction, such as pre-filling the credit card application, using the data about the user. The gateway server 108 can also request consent or authorization from the user to provide a decision on the electronic transaction based on the data about the user, such as provide a decision on the user's credit card application based on the user's credit file.

Based on the authorization, in block 310, the gateway server 108 outputs a command to the network-attached system 112 to unlock or unfreeze data and provide the data to the third-party web server 104. In some implementations, the command to unlock or unfreeze data about the user includes an approval token that is sent to the third-party web server 104. The third-party web server 104 can use the approval token to request unlocking or unfreezing and sharing data about the user at the network-attached system 112. In other implementations, the gateway server 108 may directly instruct the network-attached system 112 to unlock or unfreeze the data. In addition, depending on the log-in credentials provided by the user, the gateway server 108 can output commands to unlock or unfreeze data about the user stored in one or multiple data sources, such as multiple credit bureaus.

The network-attached system 112 can unlock or unfreeze the data about the user by changing an electronic tag associated with a data file about the user or by changing a category in which the data is stored from locked or frozen to unlocked or unfrozen. In some implementations, locked or frozen data can be stored in one location in the storage device and unlocked or unfrozen data can be stored in another location of the storage device or in another storage device. Unlocking or unfreezing the data about the user thus involves moving the data from the location in the storage device for storing locked or frozen data to another location of the storage device or another storage device for storing unlocked or unfrozen data. In this way, the unlocked or unfrozen data about users can be searched, identified and retrieved more efficiently, whereas the locked or frozen data can be protected more securely.

In block 312, the gateway server 108 outputs a command to the network-attached system 112 to lock or freeze data about the user subsequent to data being provided to the third-party web server 104 if the user has specified that the unlock and unfreeze is temporary. The network-attached system 112 can change the data back to a locked or frozen state to prevent further access by third-parties to the data. The command to unlock or unfreeze data and the command to then lock or freeze the data after providing the data to the third-party web server 104 can be provided simultaneously to the network-attached system or the command to lock or freeze the data can be provided subsequent to the gateway server 108 confirming that the data has been provided to the third-party web server 104. In other examples, if the user has specified that the unlock or unfreeze is permanent, the command to lock or freeze data is not used and the data about the user can subsequently be accessible to third parties without first being unlocked or unfrozen.

Figure 6:
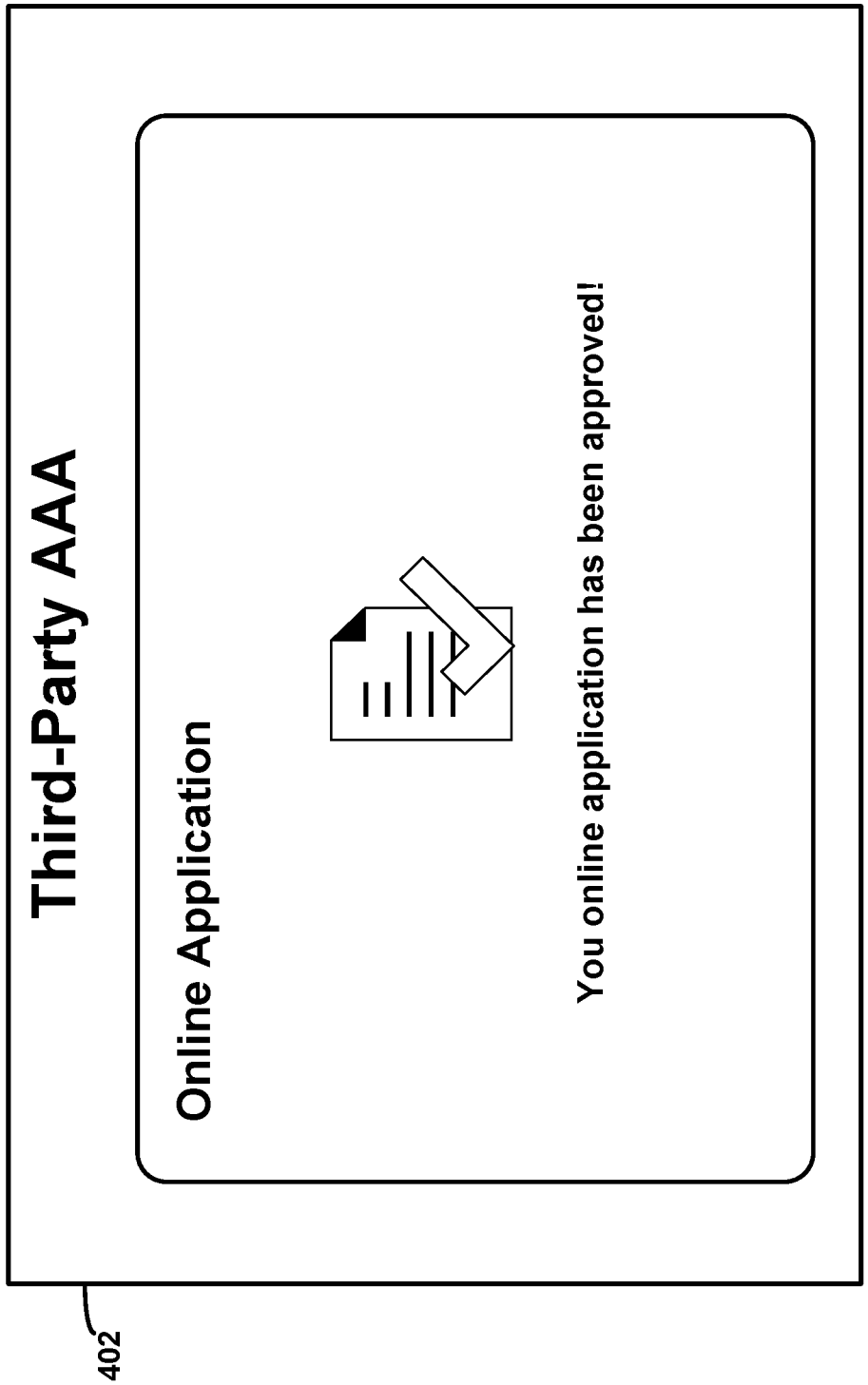
FIG. 6 depicts an example of a third-party base website that indicates that a transaction has been approved based on unlocked or unfrozen data according to certain aspects of the present disclosure.

The data about the user can be provided to the third-party web server 104 that can use the data to complete the electronic transaction with the user. In examples where the user has authorized the gateway server 108 to perform ancillary actions, the data about the user can be used by the gateway server 108 to pre-populate an online application for the user, or the data can include a decision in accordance with pre-set criteria. In the example of pre-populating an online application, the user's name, address, age, and other personally identifiable information can automatically fill in the appropriate places in an application and be confirmed by the user prior to submitting the application. After a decision has been made, the third-party website 120 can output an indication that the transaction has been approved, as shown in FIG. 6. In some examples, the gateway server 108 can receive a dispute from a user within a pre-set time window from the date of the electronic transaction, indicating that the transaction is potentially fraudulent, and the gateway server 108 can output a notification to the third party to investigate the electronic transaction.

By using certain examples of the present disclosure, users can avoid navigating separately to a data source website to unlock or unfreeze data while in the process of completing an electronic transaction with the third party. And, multiple network exchanges (from user to data sources, from third-party website to data source, from data source back to third-party website to get confirmation or consent from user, from third-party website to data source to provide consent, from data source back to third-party to provide information, etc.) can be avoided such that a network's latency can be reduced.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification that terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computing systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

The use of "adapted to" or "configured to" herein is meant as an open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

What is claimed is:

1. A gateway server device comprising:
a processor; and
a non-transitory computer-readable storage device comprising instructions that, when executed by the processor, cause the processor to:
output, via a network communications port, a website comprising a pop-up user interface that is displayable simultaneously as an overlay with at least part of a third-party website hosted by a third-party web server associated with a third party and displayed based on the third-party web server receiving an application request to request the third party to make a decision on an application, wherein the decision causes a transaction to be completed at the third-party website;
receive, via the network communications port and the website, log-in credentials, consent to unlock or unfreeze data about a user, and consent to share the data about the user with the third-party web server, wherein the data about the user is stored in a network-attached system controlled by the gateway server device;
output, via the network communications port, a command to unlock or unfreeze the data about the user, wherein the command to unlock or unfreeze the data about the user comprises an approval token, wherein the approval token is unique to the user, configurable to interface with multiple data sources, and useable by the third-party web server to request unlocking or unfreezing and sharing the data about the user;
obtain the decision on the application based on the unlocked or unfrozen data about the user, wherein the decision includes a timestamp indicating when the decision was obtained;
output, via the network communications port, a command to lock or freeze the data about the user in response to the third-party web server accessing the data about the user, wherein the third-party web server accesses the data about the user without the data about the user being provided to the gateway server device;
receive, via the network communications port, a dispute within a pre-set time window from the timestamp; and
output, via the network communications port, an indication to investigate the transaction.

2. The gateway server device of claim 1, wherein the non-transitory computer-readable storage device comprises further instructions that, when executed by the processor, cause the processor to:
output, via the network communications port, a command to lock or freeze the data about the user.

3. The gateway server device of claim 1, wherein the non-transitory computer-readable storage device comprises further instructions that when executed by the processor, cause the processor to:
fill the application using the unlocked or unfrozen data about the user; and
output the filled application to the third-party website.

4. The gateway server device of claim 1, wherein the data about the user comprises credit file data of the user.

5. The gateway server device of claim 1, wherein the command to unlock or unfreeze the data about the data about the user on the network-attached system to be unlocked or unfrozen.

6. The gateway server device of claim 1, wherein the third party is a financial institution.

7. A method that includes one or more processing devices performing operations comprising:
   outputting a user interface comprising a pop-up user interface that is displayable simultaneously as an overlay with at least part of a third-party user interface hosted by a third-party web server associated with a third party and displayed based on the third-party web server receiving an application request to request the third party to make a decision on an application, wherein the decision causes a transaction to be completed at the third-party user interface;
   receiving, via the user interface, sign-in data, consent to unlock or unfreeze data about a user, and consent to share the data about the user with the third-party web server, wherein the data about the user is stored in a network-attached system controlled by a gateway server device, wherein the consent includes a timestamp indicating when the consent was received;
   outputting a command to unlock or unfreeze the data about the user, wherein the command to unlock or unfreeze the data about the user comprises an approval token, wherein the approval token is unique to the user, configurable to interface with multiple data sources, and useable by the third-party web server to request unlocking or unfreezing and sharing the data about the user at a network attached system;
   obtaining the decision on the application based on the unlocked or unfrozen data about the user;
   outputting a command to lock or freeze the data about the user in response to the third-party web server accessing the data about the user, wherein the third-party web server accesses the data about the user without the data about the user being provided to the gateway server device;
   receiving a dispute within a pre-set time window from the timestamp; and
   outputting an indication to investigate the transaction.

8. The method of claim 7, further comprising:
   outputting a command to lock or freeze the data about the user after sharing information based on the data about the user with the third-party web server.

9. The method of claim 7, further comprising:
   filling the application using the unlocked or unfrozen data about the user; and
   outputting the filled application to the third-party user interface.

10. The method of claim 7, wherein the data about the user comprises credit file data of the user.

11. The method of claim 7, wherein the command to unlock or unfreeze the data about the user can cause the data about the user on the network-attached system to be unlocked or unfrozen.

12. The method of claim 7, wherein the sign-in data comprise at least one of log-in credentials or a freeze PIN.

13. A non-transitory computer-readable storage medium having program code that, when executed by a processor device, to cause the processor device to perform operations, the operations comprising:
   outputting a user interface website comprising a pop-up user interface that is displayable simultaneously as an overlay with at least part of a third-party user interface hosted by a third-party web server associated with a third party and displayed based on the third-party web server receiving an application request to request the third party to make a decision on an application, wherein the decision causes a transaction to be completed at the third-party user interface;
   receiving, via the user interface, signing-in data, consent to unlock or unfreeze data about a user, and consent to share the data about the user with the third-party web server, wherein the data about the user is stored in a network-attached system controlled by a gateway server device;
   outputting a command to unlock or unfreeze the data about the user, wherein the command to unlock or unfreeze the data about the user comprises an approval token, wherein the approval token is unique to the user, configurable to interface with multiple data sources, and useable by the third-party web server to request unlocking or unfreezing and sharing the data about the user at a network-attached system;
   obtaining the decision on the application based on the unlocked or unfrozen data about the user, wherein the decision includes a timestamp indicating when the decision was obtained;
   outputting a command to lock or freeze the data about the user in response to the third-party web server accessing the data about the user, wherein the third-party web server accesses the data about the user without the data about the user being provided to the gateway server device;
   receiving a dispute within a pre-set time window from the timestamp; and
   outputting an indication to investigate the transaction.

14. The non-transitory computer-readable storage medium of claim 13, wherein the operations further comprise:
   outputting a command to lock or freeze the data about the user after sharing information based on the data about the user with the third-party web server.

15. The non-transitory computer-readable storage medium of claim 13, wherein the operations further comprise:
   filling the application using the unlocked or unfrozen data about the user; and
   outputting the filled application to the third-party user interface.

16. The non-transitory computer-readable storage medium of claim 13, wherein the data about the user comprises credit file data of the user.

17. The non-transitory computer-readable storage medium of claim 13, wherein the command to unlock or unfreeze the data about the user can cause the data about the user on the network-attached system to be unlocked or unfrozen.

* * * * *